United States Patent
Magarill et al.

(10) Patent No.: US 7,411,734 B2
(45) Date of Patent: Aug. 12, 2008

(54) COLOR-SPLITTING OPTICAL ELEMENT AND AN OPTICAL SYSTEM UTILIZING THE COLOR-SPLITTING OPTICAL ELEMENT

(75) Inventors: Simon Magarill, Cincinnati, OH (US); Stephen K. Eckhardt, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1 day.

(21) Appl. No.: 11/272,228

(22) Filed: Nov. 10, 2005

(65) Prior Publication Data

US 2007/0103788 A1 May 10, 2007

(51) Int. Cl.
*G02B 27/12* (2006.01)

(52) U.S. Cl. .................... 359/640; 359/831; 348/338

(58) Field of Classification Search ................. 359/634, 359/639, 720–721, 722, 618, 629–640, 805, 359/490, 831–837; 353/81, 31, 38; 348/757, 348/338; 369/112.2
See application file for complete search history.

(56) References Cited

U.S. PATENT DOCUMENTS

| | | | | |
|---|---|---|---|---|
| 2,178,245 | A | * | 10/1939 | Schwarz ..................... 359/638 |
| 3,767,290 | A | * | 10/1973 | Lang et al. .................. 359/490 |
| 4,444,464 | A | | 4/1984 | Minott |
| 4,943,154 | A | * | 7/1990 | Miyatake et al. ............... 353/31 |
| 5,098,183 | A | | 3/1992 | Sonehara |
| 5,235,444 | A | * | 8/1993 | de Vaan ......................... 349/9 |
| 5,355,187 | A | | 10/1994 | Ogino et al. |
| 5,515,206 | A | | 5/1996 | Peng |
| 5,568,317 | A | | 10/1996 | Bohn |
| 5,644,432 | A | * | 7/1997 | Doany ........................ 359/634 |
| 5,694,256 | A | | 12/1997 | Winkler |
| 5,784,209 | A | | 7/1998 | Manabe |
| 5,864,374 | A | | 1/1999 | Ito et al. |
| 5,892,623 | A | * | 4/1999 | Bradley ....................... 359/618 |
| 5,896,232 | A | | 4/1999 | Budd |
| 5,944,401 | A | | 8/1999 | Murakami |
| 5,951,135 | A | * | 9/1999 | Bigelow et al. ............... 353/30 |

(Continued)

FOREIGN PATENT DOCUMENTS

DE 362 482 10/1922

(Continued)

OTHER PUBLICATIONS

First Named Inventor Simon Magarill. U.S. Appl. No. 11/459,238, filed Jul. 21, 2006.

*Primary Examiner*—Ricky L Mack
*Assistant Examiner*—James R Greece

(57) ABSTRACT

A color-splitting optical element is disclosed that includes a first prism having a first transmissive curved outer side, a second transmissive curved outer side and an inner side. The color-splitting optical element also includes a second prism having a first transmissive curved outer side, a second side and an inner side. A dichroic element is disposed between the inner side of the first prism and the inner side of the second prism. The first transmissive curved outer side of the first prism is disposed generally opposite the first transmissive curved outer side of the second prism along a first direction and the second transmissive curved outer side of the first prism is disposed generally opposite the second side of the second prism along a second direction. Also disclosed are optical systems utilizing such color-splitting optical elements.

20 Claims, 1 Drawing Sheet

U.S. PATENT DOCUMENTS

| | | |
|---|---|---|
| 5,959,778 A | 9/1999 | Shimonura et al. |
| 5,986,815 A | 11/1999 | Bryars |
| 6,028,660 A * | 2/2000 | Van Der Laan et al. ....... 355/67 |
| 6,130,784 A * | 10/2000 | Takahashi ................... 359/630 |
| 6,171,421 B1 * | 1/2001 | Murata et al. ................. 156/99 |
| 6,335,838 B1 | 1/2002 | Kasai |
| 6,375,330 B1 | 4/2002 | Mihalakis |
| 6,411,449 B1 | 6/2002 | Hashizume |
| 6,426,837 B1 | 7/2002 | Clark |
| 6,585,378 B2 | 7/2003 | Kurtz et al. |
| 6,665,123 B2 | 12/2003 | Nakajo |
| 6,671,099 B2 | 12/2003 | Nagata |
| 6,717,736 B1 | 4/2004 | Hill |
| 6,739,723 B1 | 5/2004 | Haven |
| 6,856,464 B1 | 2/2005 | Poradish et al. |
| 7,085,063 B2 | 8/2006 | Magarill et al. |
| 2001/0022689 A1 | 9/2001 | Takeyama |
| 2003/0193650 A1 * | 10/2003 | Sugawara .................... 353/31 |

FOREIGN PATENT DOCUMENTS

| | | |
|---|---|---|
| EP | 0 302 737 | 2/1989 |
| FR | 775 060 | 12/1934 |
| JP | HEI 5-142499 | 6/1993 |
| JP | 2002-341440 | 11/2002 |
| JP | 2003-75614 | 3/2003 |
| JP | 2003-240926 | 8/2003 |
| WO | WO 93/20472 | 10/1993 |

* cited by examiner

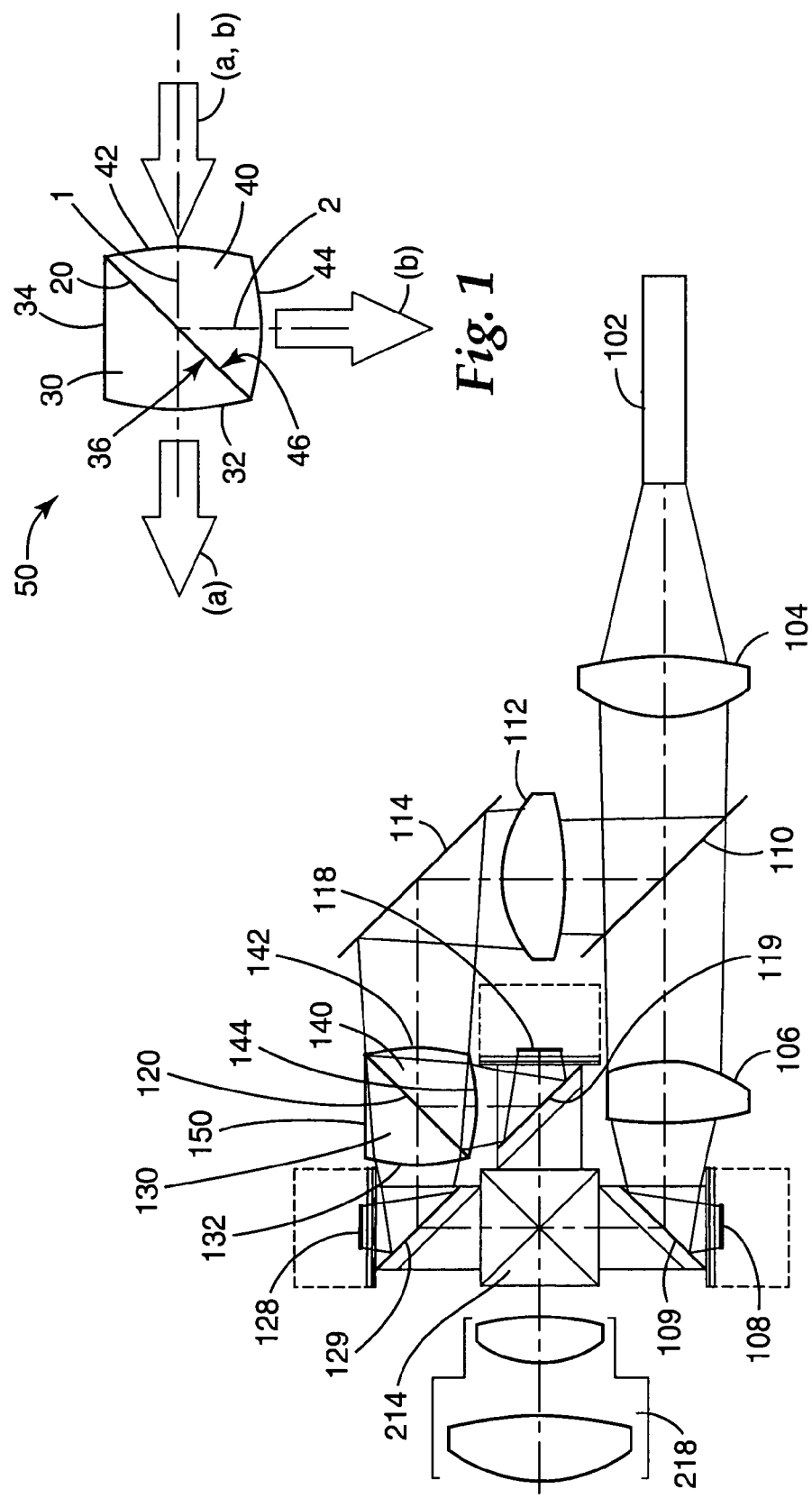

COLOR-SPLITTING OPTICAL ELEMENT AND AN OPTICAL SYSTEM UTILIZING THE COLOR-SPLITTING OPTICAL ELEMENT

FIELD OF THE INVENTION

The present disclosure relates to color-splitting optical elements, and, more specifically, the present disclosure relates to color-splitting optical elements capable of refracting light in at least two different directions. The present disclosure is also directed to optical systems, such as image display systems, including color-splitting optical elements.

BACKGROUND

Optical systems are widespread and often include a light source or sources and a system of optical elements. A typical image display system incorporates an illumination source that is arranged so that light rays from the illumination source reflect off of an image-forming device or imager that contains the desired image to be projected. One common type of imager is a polarization-rotating image-forming device, such as a liquid crystal on silicon (LCoS) device, which operates by rotating polarization of the incident light rays. More particularly, in a reflective polarization-rotating imager, polarized light rays are either reflected with their polarizations substantially unmodified for the darkest state or reflected with their polarizations rotated to provide a desired gray scale.

In some image display systems, a light beam originating from a light source or an assembly of light sources may be split into two or more beams traveling in different directions, which may or may not be recombined further downstream. In other types of optical systems, light beams originating from different light sources or light source assemblies may initially travel in different directions, and also may or may not be recombined further downstream. Such multi-directional optical systems are usually relatively complex and include large numbers of various optical elements. Folding mirrors are commonly used to fold the optical paths and thus reduce the footprints of large complicated optical systems.

SUMMARY

The present disclosure is directed to color-splitting optical elements including a first prism having a first transmissive curved outer side, a second transmissive curved outer side and an inner side, and a second prism having a first transmissive curved outer side, a second side and an inner side. A dichroic element is disposed between the inner side of the first prism and the inner side of the second prism. The first transmissive curved outer side of the first prism is disposed generally opposite the first transmissive curved outer side of the second prism along a first direction and the second transmissive curved outer side of the first prism is disposed generally opposite the second side of the second prism along a second direction.

The present disclosure is also directed to optical systems for use with a source of light including first and second colors, including a color-splitting optical element. The color-splitting element includes a first prism having a first transmissive curved outer side, a second transmissive curved outer side and an inner side, and a second prism having a first transmissive curved outer side, a second side and an inner side. A dichroic element is disposed between the inner side of the first prism and the inner side of the second prism. The first transmissive curved outer side of the first prism is disposed generally opposite the first transmissive curved outer side of the second prism along a first direction and the second transmissive curved outer side of the first prism is disposed generally opposite the second side of the second prism along a second direction.

In this exemplary implementation, the first transmissive curved outer side of the first prism is a light entrance side, the first transmissive curved outer side of the second prism is a second light exit side and the second transmissive curved outer side of the first prism is a first light exit side. A first illumination target is disposed to receive light from the first light exit side, and a second illumination target is disposed to receive light from the second light exit side.

In addition, the present disclosure is directed to optical systems including a source of light comprising first, second and third colors, a dichroic splitter configured to split light of the first and second colors from light of the third color, and a color-splitting optical element. The color-splitting optical element includes a first prism having a first transmissive curved outer side, a second transmissive curved outer side and an inner side, and a second prism having a first transmissive curved outer side, a second side and an inner side. A dichroic element is disposed between the inner side of the first prism and the inner side of the second prism. The first transmissive curved outer side of the first prism is disposed generally opposite the first transmissive curved outer side of the second prism along a first direction and the second transmissive curved outer side of the first prism is disposed generally opposite the second side of the second prism along a second direction.

In this exemplary implementation, the color-splitting optical element is configured and disposed such that the first transmissive curved outer side receives light comprising first and second colors and such that the dichroic element transmits light of the first color toward the first transmissive curved outer side of the second prism and reflects light of the second color toward the second transmissive curved outer side of the first prism. A first illumination target is disposed to receive light of the first color transmitted through the first transmissive curved outer side of the second prism, and a second illumination target is disposed to receive light of the second color transmitted through the second transmissive curved outer side of the first prism. A third illumination target is disposed to receive light of the third color from the dichroic splitter.

These and other aspects of the color-splitting optical elements of the subject invention and of the optical systems including such color-splitting optical elements will become readily apparent to those of ordinary skill in the art from the following detailed description together with the drawings.

BRIEF DESCRIPTION OF THE DRAWINGS

So that those of ordinary skill in the art to which the subject invention pertains will more readily understand how to make and use the subject invention, exemplary embodiments thereof will be described in detail below with reference to the drawings, wherein:

FIG. 1 shows schematically a cross-sectional view of an exemplary color-splitting optical element constructed according to the present disclosure; and FIG. 2 shows schematically a portion of an exemplary optical system, such as an image display system, incorporating an exemplary color-splitting optical element constructed according to the present disclosure.

DETAILED DESCRIPTION

Exemplary embodiments of the present disclosure are suitable for use in multi-directional optical systems where light travels along two or more directions, such as image display systems including two or more imagers.

FIG. 1 shows schematically a cross-sectional view of an exemplary color-splitting optical element 50, constructed in accordance with the present disclosure. The color-splitting optical element 50 includes a first prism 40 and a second prism 30. Although the components 40 and 30 of the color-splitting optical element 50 are referred to as "prisms," this term is used for simplicity purposes only, and the present disclosure encompasses configurations of components 40 and 30 that are prismatic, approximately prismatic and those that deviate from prismatic shape. The prisms 40 and 30 can be made from any suitable material, preferably non-scattering optically clear material, such as glass, plastic or another suitable transparent material. The prisms 40 and 30 are monolithic constructions that do not have any seams, which helps maximize transmission for a particular material.

The first prism 40 has a first transmissive curved outer side 42, a second transmissive curved outer side 44 and an inner side 46. The second prism 30 has a first transmissive curved outer side 32, a second side 34 (which may or may not be an outer side) and an inner side 36. A side is referred to as an "outer side" if it is exposed to atmosphere in which the optical element is used or if the side bears a relatively thin coating or film but not if it is in contact with another thick refractive element, such as a prism or a lens. A side is referred to as "transmissive" where it is configured to transmit at least a substantial amount of light of at least one polarization orientation. Preferably, each transmissive side transmits at least 50%, more preferably at least 70%, and even more preferably at least 90%, of light at normal incidence having a particular polarization characteristic. In some exemplary embodiments, one or more of the transmissive sides transmits at least a substantial amount of light of all polarization orientations.

The second side 34 of the second prism 30 may be planar or curved. In typical embodiments of the present disclosure, the second side 34 is a non-optical surface (a surface that is not intended to receive significant amounts of light) and in some exemplary embodiments, it may include mounting structures. Mounting structures could include depressions and/or protrusion such as tabs, bosses, flanges, snaps. Alternatively or additionally, mounting structures may be disposed on other sides of the color-splitting optical element, e.g., on the sides that would face generally toward or away from the viewer of FIG. 1.

Each of the transmissive curved outer sides 42, 44 and 32 can be characterized by a particular curvature. For the purposes of the present disclosure, a curved surface is a surface that has a surface profile with more than 30λ peak-to-valley difference, where λ is about 550 nm. Exemplary embodiments of the present disclosure usually will include one or more curved surfaces having a surface profile with 60λ or more peak-to-valley difference, or 120λ or more peak-to-valley difference. One or more of the curvatures can be a spherical curvature, aspherical curvature or a cylindrical curvature, as desired for a particular application. In typical embodiments of the present disclosure, one or more transmissive curved outer sides have non-zero optical power.

In some exemplary embodiments, the second transmissive curved outer side 44 of the first prism 40 has about the same curvature as the first transmissive curved outer side 32 of the second prism 30. In some exemplary embodiments, the first transmissive curved outer side 42 of the first prism 44 is concave and the second transmissive curved outer side 46 of the first prism 40 and the first transmissive curved outer side 32 of the second prism 30 are both convex. In other exemplary embodiments, the first transmissive curved outer side 42 of the first prism 44 is convex. Optionally, one or more of the transmissive curved outer sides includes microstructures, such as Fresnel grooves, diffractive grooves or prismatic structures.

In the exemplary embodiment shown in FIG. 1, the first transmissive curved outer side 42 of the first prism 40 is disposed generally opposite the first transmissive curved outer side 32 of the second prism 30 along a first direction (1) and the second transmissive curved outer side 44 of the first prism 40 is disposed generally opposite the second side 34 of the second prism along a second direction (2). In some exemplary embodiments, the first direction (1) makes an angle of about 90 degrees with respect to the second direction (2), i.e., the first direction is generally orthogonal to the second direction. In other exemplary embodiments, the first direction (1) can make any other suitable acute or obtuse angle with respect to the second direction (2).

The color-splitting optical element 50 further includes a dichroic element 20 disposed between the inner side 46 of the first prism 40 and the inner side 36 of the second prism 30. Those of ordinary skill in the art will readily appreciate that the dichroic element 20 of the exemplary color-splitting optical element 50 is disposed along a diagonal of the color-splitting optical element 50. Suitable dichroics include any optical element that transmits light within a particular wavelength band and reflects light within a different wavelength band. One exemplary dichroic element includes a multilayer stack of dielectric films, which can be vacuum deposited, extruded or laminated together.

Referring further to the exemplary embodiment shown in FIG. 1, the transmissive curved outer surface 42 may be a light entrance side. Light (a,b) incident onto and transmitted through the transmissive curved outer side 42, includes light of at least two different colors, for example a first color (a) and a second color (b). In a broadband color-splitting element, the term "color" will be used to refer to the middle wavelength of a wavelength range of the appropriate spectral band. For example, the band of 600-700 nm is sometimes referred to as "red" light, the band of 585-600 nm is sometimes referred to as "orange" light, the band of 560-585 nm is sometimes referred to as "yellow" light, the band of 490-560 nm is sometimes referred to as "green" light, and the band of 400-490 nm is sometimes referred to as "blue" light. Depending on the type of its curvature (e.g., concave or convex), the transmissive curved outer surface 42 either focuses or spreads the light (a,b), which travels in the first prism 40 generally along the first direction (1) and toward the dichroic element 20.

The dichroic element 20 reflects at least a substantial portion of light having a second color (b) toward the second transmissive curved outer side 44 of the first prism 40, such that light of the second color (b) travels in the first prism 40 generally along the second direction (2). Preferably, the dichroic element 20 reflects substantially all light having a second color (b). In some exemplary configurations, the second transmissive curved outer side 44 of the first prism 40 is a second light exit side. Depending on the type of its curvature (e.g., concave or convex), the transmissive curved outer surface 44 either focuses or spreads the light (b) as it exits the color-splitting element 50. Light transmitted by the dichroic element 20, which includes light of the first color (a) as well as any leaked light of the second color (b), travels generally along the first direction (1) in the second prism 30 toward its first transmissive curved outer side 32. Preferably, the amount of leaked light of the second color (b) is insignificant. In some exemplary configurations, the first transmissive curved outer side 32 of the second prism 30 is a first light exit side. Depending on the type of the curvature of the side 32 (e.g., concave or convex), the transmissive curved outer surface 32 either focuses or spreads the light (a) as it exits the color-splitting element 50.

In some exemplary embodiments, one or more of the transmissive curved outer surfaces 44 and 32 can be preferentially constructed for a particular color, for example, the first color (a) or the second color (b). In the context of the present disclosure, the term "preferentially constructed" encompasses any feature of the optical element this term refers to that would appreciably improve its performance, such as transmission or aberration correction. For example, curvature of at least one of the outer sides 32 and 44 can be tailored to the color of light transmitted therethrough, which may reduce color aberrations. Another example of preferential construction includes disposing a color-specific coating on one or both of the transmissive curved outer surfaces 44 and 32. In one exemplary embodiment, the surface 32 is provided with an anti-reflection coating for light of the first color (a) and the surface 44 is provided with an anti-reflection coating for light of the second color (b).

Exemplary color-splitting elements of the present disclosure may further include polarizing film (not shown) disposed on one or more of their transmissive curved outer surfaces. In the color-splitting element 50 shown in FIG. 1, a polarizing film can be disposed on any one, two or all of the transmissive curved outer surface 32, transmissive curved outer surface 44 and transmissive curved outer surface 42. Any suitable polarizing films can be used, including but not limited to: reflective polarizers, such as linear reflective polarizers, e.g., multilayer reflective polarizing films and diffusely reflective polarizers including a continuous phase and a disperse phase disposed within the continuous phase, circular reflective polarizers, e.g., cholesteric reflective polarizers; and absorbing polarizers.

FIG. 2 shows schematically an exemplary optical system 100 incorporating a color-splitting optical element 150 constructed according to the present disclosure. The exemplary color-splitting optical element 150 is similar in structure to the exemplary color-splitting optical element 50, and it includes a first prism 140 having first and second transmissive curved outer sides 142 and 144, a second prism 130 having a first transmissive curved outer side 132, and a dichroic element 120 disposed between the first and second prisms 140 and 130. The exemplary optical system 100 can be a portion of a 3-imager projection system. Such projection systems can be used with reflective polarization-rotating imagers, such as Liquid Crystal on Silicon (LCoS), for forming images of three primary colors (for example, red, green and blue) that are then combined to form a multi-colored image. Optical systems for use with light sources of other colors, as suitable for a particular application, are also within the scope of the present disclosure.

The exemplary optical system 100 shown in FIG. 2 can be used with any suitable source of illumination (not shown). Preferably, the light source is a broadband light source or a light source assembly or assemblies. Light sources suitable for use with the present disclosure include arc lamps, such as high-pressure mercury arc lamps commonly used for projection applications, LEDs or light source assemblies including LEDs. In some exemplary embodiments, the source of illumination may include a laser or lasers. In an exemplary embodiment, light source can provide light including first and second colors. In such exemplary optical systems, the color-splitting optical element 150 can be disposed such that when light comprising first and second colors is received by the first transmissive curved outer side 142 of the first prism 140 (light entrance side) and is transmitted toward the dichroic element 120 along the first direction (1), the dichroic element 120 transmits light of the first color toward the first transmissive curved outer side 132 of the second prism 130 (first light exit side), also along the first direction (1) and reflects light of the second color toward the second transmissive curved outer side 144 of the first prism 140 (second light exit side) along the second direction (2). The first direction and the second direction may form an angle of about 90 degrees with respect to each other, but other angles are within the scope of the present disclosure. The optical system 100 further includes a first illumination target 128 disposed to receive light of the first color transmitted through the first transmissive curved outer side 132 of the second prism 130 and a second illumination target 118 disposed to receive light of the second color reflected by the dichroic element 120 and transmitted through the second transmissive curved outer side 144 of the first prism 140.

In some exemplary embodiments, the color-splitting element 150 of the optical system 100 may be configured such that the first transmissive curved outer side 132 of the second prism 130 is preferentially constructed for light of the first color. Additionally or alternatively, the second transmissive curved outer side 144 of the first prism 140 can be preferentially constructed for light of the second color, as explained above. For example, the first transmissive curved outer side 132 of the second prism 130 can include a color-specific coating, e.g., an anti-reflective coating for the first color. Additionally or alternatively, the second transmissive curved outer side 144 of the first prism 140 can include a color specific coating, e.g., an anti-reflective coating for the second color.

One or both first and second illumination targets 128 and 118 can be reflective polarization-rotating imagers, such as LCoS. In such exemplary embodiments, polarizing beamsplitters 129 and 119 may be included into the optical system 100 for pre-polarizing light ultimately incident onto the illumination targets 128 and 118, respectively. Polarizing beamsplitter 129, 119 or both can be disposed such that light reflected by a polarizing beamsplitter is incident onto its respective polarization-rotating imager.

In some exemplary embodiments, the optical system 100 can include a broadband source of light (not shown) including first, second and third colors. The first, second and third colors can, in some cases, correspond to red, green and blue. The optical system 100 can further include an integrator 102. Integrators typically serve to homogenize the light passing through such that the light could be supplied to the illumination target in a more uniform state. Presently known integrators include fly-eye integrators and mirror tunnels, for example, rectangular tunnels, solid or hollow, and elongated tunnels composed of solid glass. An integrator may be followed by a refractive optical element or elements 104.

The optical system 100 can also include a dichroic splitter 110, which in some exemplary embodiments is configured to separate light of the first and second colors from light of the third color. In the exemplary embodiment shown in FIG. 2, the dichroic splitter 110 is configured to reflect light of the first and second colors and to transmit light of the third color. This exemplary optical system 100 may further include a mirror 114 disposed to receive light of the first and second colors from the dichroic splitter 110 and reflect that light toward the first transmissive curved outer surface 142 of the first prism 140 of the color-Express splitting element 150. A refractive optical element or elements 112 may be provided between the dichroic splitter 110 and the mirror 114.

The optical system 100 can also include a third illumination target 108, such as a reflective polarization-rotating imager, disposed to receive light of the third color from the dichroic splitter 110. In the exemplary embodiments utilizing polarization-rotating imagers, a polarizing beamsplitter 109 may be included into the optical system 100 for pre-polarizing light ultimately incident onto the illumination target 108. Polarizing beamsplitter 109 can be disposed such that light of the third color reflected by the polarizing beamsplitter 109 is incident onto the polarization-rotating imager 108. A refractive optical element or elements 106 may be provided between the dichroic splitter 110 and the illumination target 108. One or more of the refractive elements 106 can be truncated, e.g., as illustrated in FIG. 2, to produce a more compact optical system.

In some exemplary embodiments, light modulated by the imagers 108, 118 and 128 may be combined using a cross dichroic combiner 214. The combined beams are then collected by the projection optics 218 for delivery to a screen (not shown) or to another optical element or device for further processing.

Exemplary optical systems, such as illumination systems for projection applications, may be constructed with the following parameters, which are based on mathematical modeling of an optical system shown in FIG. 2, with red, green and blue color illumination. More particularly, such a modeled optical system may be used as an illumination system in a three-imager LCoS-based projector. LCoS (imager) size can be 8.717×15.566 mm (0.7" diagonal) with the effective f-number being 2.3. It will be understood that the numbers of decimals in the modeled data are provided for illustration purposes only and are not intended to limit the scope of the present disclosure.

In the modeled optical system, mixed red, green and blue light is homogenized with a hollow integrator 102 having an about 3.63×6.48 mm clear aperture and about 25 mm length. Homogenized light is then collimated by a lens 104 and split into red and blue/green components of spectrum by the red/cyan dichroic splitter 110. Other parameters of the portion of the exemplary modeled system traversed by red light are shown in Table 1.

TABLE 1

| Element | Radius (mm) | Thickness/Distance to next surface (mm) | Material | Clear Aperture (mm) | Conic Constant |
|---|---|---|---|---|---|
| Lens (104) | 25.129 | 14.00 | Acrylic | 36.3 | −1.684 |
|  | −23.975 | 13.38 |  | 36.3 | −2.4226 |
| Red/cyan dichroic (110) |  | 37.12 |  |  |  |
| Lens (106) | −22.757 | 5.78 | Polycarbonate | 23.0 |  |
|  | −11.507 | 1.58 |  | 23.0 | −1.4315 |
| Polarizing Beam Splitter (109) |  | 17.50 | SK5 | 17.5 × 31.0 |  |
|  |  | 0 |  | 17.5 × 31.0 |  |
| Cover glass substrate placed over imager |  | 1.70 | BK7 | 17.5 × 31.0 |  |
|  |  | 1.40 |  | 17.5 × 31.0 |  |
| LCoS imager (108) |  |  |  | 8.72 × 15.57 |  |

Table 2 shows parameters of the portion of the exemplary modeled system traversed by blue and green light only, beginning with its reflection at the dichroic splitter 110.

TABLE 2

| Element | Radius (mm) | Thickness/Distance to next surface (mm) | Material | Clear Aperture (mm) | Conic Constant |
|---|---|---|---|---|---|
| Red/cyan dichroic (110) |  | 19.03 |  |  |  |
| Lens (112) | −6.478 | 8.00 | Acrylic | 15.3 | −0.6172 |
|  | −8.902 | 19.00 |  | 21.4 | −0.6432 |
| Mirror (114) |  | 17.82 |  |  |  |
| Color-splitting element (150) | 71.167 (surface 142) | 26.00 | Polycarbonate | 20 × 31 | 3.4516 |
|  | −80 (surfaces 144, 132) | 1.00 |  | 20 × 31 |  |
| Polarizing Beam Splitters (119, 129) |  | 17.50 | SK5 | 17.5 × 31.0 |  |
|  |  | 0 |  | 17.5 × 31.0 |  |

TABLE 2-continued

| Element | Radius (mm) | Thickness/Distance to next surface (mm) | Material | Clear Aperture (mm) | Conic Constant |
|---|---|---|---|---|---|
| Cover glass | | 1.70 | BK7 | 17.5 × 31.0 | |
| substrate placed over imager | | 1.40 | | 17.5 × 31.0 | |
| LCoS imagers (118, 128) | | | | 8.72 × 15.57 | |

As it is apparent from Table 2, the modeled exemplary optical system includes a polycarbonate color-splitting optical element with convex curved outer sides 142, 144 and 132. In this exemplary color-splitting element, the curvatures of the outer sides 144, 132 have the same spherical curvatures and the curvature of the outer side 142 is aspherical.

Exemplary embodiments of the color-splitting elements of the present disclosure can be used to make compact optical systems, for example, by reducing or eliminating the need for additional refractive optical elements. The curved outer sides, e.g., a curved outer light entrance side, a curved outer first light exit side and a curved outer second light exit side, may all be used to focus light that travels in the color-splitting optical element along the first and second directions. Due to the reduced need for the additional refractive optical elements, optical systems utilizing exemplary embodiments of the present disclosure can be easier to assemble and align and can be made more robust.

Although the color-splitting optical elements of the present disclosure and optical systems utilizing such optical elements have been described with reference to specific exemplary embodiments, those of ordinary skill in the art will readily appreciate that changes and modifications can be made thereto without departing from the spirit and scope of the present invention. For example, the shape, size and material of the color-splitting optical element can be different depending on the application. In addition to the elements shown and described herein, the optical systems constructed in accordance with the present disclosure can include additional refractive optical elements, reflective optical elements, dichroic optical elements and other optical and non-optical elements, as desired for a particular application. Furthermore, although the exemplary embodiments of the present disclosure have been described with reference to red, green and blue colors of illumination, other types and numbers of colors may be used in place of or in addition to the colors described without departing from the scope of the present disclosure.

What is claimed is:

1. A color-splitting optical element comprising:
   a first prism having a first transmissive curved outer side, a second transmissive curved outer side and an inner side;
   a second prism having a first transmissive curved outer side, a second side and an inner side; and a dichroic element disposed between the inner side of the first prism and the inner side of the second prism;
   wherein the first transmissive curved outer side of the first prism is disposed generally opposite the first transmissive curved outer side of the second prism along a first direction and the second transmissive curved outer side of the first prism is disposed generally opposite the second side of the second prism along a second direction, and wherein the first transmissive curved outer side of the first prism is operable to receive a light beam originating from a source of light for a first pass through the first prism.

2. The color-splitting optical element of claim 1, wherein the second transmissive curved outer side of the first prism has about the same curvature as the first transmissive curved outer side of the second prism.

3. The color-splitting optical element of claim 1, wherein the first transmissive curved outer side of the first prism, the second transmissive curved outer side of the first prism and the first transmissive curved outer side of the second prism are convex.

4. The color-splitting optical element of claim 1, wherein the first direction makes an angle of about 90 degrees with respect to the second direction.

5. The color-splitting optical element of claim 1, further comprising a color-specific coating disposed on at least one of the first transmissive curved outer side of the second prism and the second transmissive curved outer side of the first prism.

6. The color-splitting optical element of claim 1, further comprising a polarizing film disposed on at least one of the first transmissive curved outer side of the second prism and the second transmissive curved outer side of the first prism.

7. The color-splitting optical element as recited in claim 1, wherein at least one of the transmissive curved outer sides includes microstructures.

8. An optical system for use with a source of light including first and second colors, comprising:
   a color-splitting optical element comprising
      a first prism having a first transmissive curved outer side, a second transmissive curved outer side and an inner side, a second prism having a first transmissive curved outer side, a second side and an inner side, and a dichroic element disposed between the inner side of the first prism and the inner side of the second prism, wherein the first transmissive curved outer side of the first prism is disposed generally opposite the first transmissive curved outer side of the second prism along a first direction and the second transmissive curved outer side of the first prism is disposed generally opposite the second side of the second prism along a second direction,
      wherein the first transmissive curved outer side of the first prism is a light entrance side operable to receive a light beam originating from the source of light for a first pass through the first prism, the second transmissive curved outer side of the first prism is a second light exit side, and the first transmissive curved outer side of the second prism is a first light exit side;
   a first illumination target disposed to receive light from the first light exit side of the color-splitting optical element; and a second illumination target disposed to receive light from the second light exit side of the color-splitting optical element.

9. The optical system of claim 8, wherein the first direction makes an angle of about 90 degrees with respect to the second direction.

10. The optical system of claim 8, wherein at least one of the first transmissive curved outer side of the second prism and the second transmissive curved outer side of the first prism is preferentially constructed for light of the first or second color.

11. The optical system of claim 8, further comprising a color-specific coating disposed on at least one of the first transmissive curved outer side of the second prism and the second transmissive curved outer side of the first prism.

12. The optical system of claim 8, wherein at least one of the first and second illumination targets comprises a polarization-rotating imager.

13. The optical system of claim 8, wherein at least one of the first and second illumination targets comprises a polarization-rotating imager and a polarizing beamsplitter disposed such that light reflected by the polarizing beamsplitter is incident onto the polarization-rotating imager.

14. An optical system comprising:
a source of light comprising first, second and third colors;
a dichroic splitter configured to split light of the first and second colors from light of the third color;
a color-splitting optical element comprising
a first prism having a first transmissive curved outer side, a second transmissive curved outer side and an inner side, a second prism having a first transmissive curved outer side, a second side and an inner side, and a dichroic element disposed between the inner side of the first prism and the inner side of the second prism, wherein the first transmissive curved outer side of the first prism is disposed generally opposite the first transmissive curved outer side of the second prism along a first direction and the second transmissive curved outer side of the first prism is disposed generally opposite the second side of the second prism along a second direction,
the color-splitting optical element configured and disposed such that the first transmissive curved outer side receives light comprising first and second colors from the source of light for a first pass through the first prism and such that the dichroic element transmits light of the first color toward the first transmissive curved outer side of the second prism and reflects light of the second color toward the second transmissive curved outer side of the first prism;
a first illumination target disposed to receive light of the first color transmitted through the first transmissive curved outer side of the second prism;
a second illumination target disposed to receive light of the second color transmitted through the second transmissive curved outer side of the first prism; and
a third illumination target disposed to receive light of the third color from the dichroic splitter.

15. The optical system of claim 14, wherein the dichroic splitter reflects light of the first and second colors and transmits light of the third color, and wherein the optical system further comprises a mirror disposed to receive light of the first and second colors from the dichroic splitter and reflect that light toward the first transmissive curved outer surface of the first prism of the color-splitting element.

16. The optical system of claim 15, further comprising a refractive optical element disposed between the dichroic splitter and the third illumination target.

17. The optical system of claim 16, further comprising a refractive optical element disposed between the dichroic splitter and the mirror.

18. The optical system of claim 14, wherein at least one of the first, second and third illumination targets comprises a polarization-rotating imager.

19. The optical system of claim 14, wherein at least one of the first, second and third illumination targets comprises a polarization-rotating imager and a polarizing beamsplitter disposed such that light reflected by the polarizing beamsplitter is incident onto the polarization-rotating imager.

20. The optical system of claim 14, further comprising an integrator disposed between the source of light and the dichroic splitter.

* * * * *

UNITED STATES PATENT AND TRADEMARK OFFICE
CERTIFICATE OF CORRECTION

| | | |
|---|---|---|
| PATENT NO. | : 7,411,734 B2 | Page 1 of 1 |
| APPLICATION NO. | : 11/272228 | |
| DATED | : August 12, 2008 | |
| INVENTOR(S) | : Simon Magarill | |

It is certified that error appears in the above-identified patent and that said Letters Patent is hereby corrected as shown below:

Column 7
Line 1, after "color-" delete "Express".

Signed and Sealed this

Eighteenth Day of November, 2008

JON W. DUDAS
*Director of the United States Patent and Trademark Office*